United States Patent [19]
Jable et al.

[11] Patent Number: 5,078,420
[45] Date of Patent: Jan. 7, 1992

[54] TANDEM WHEEL AND AXLE SUSPENSION

[75] Inventors: Roger D. Jable, Downers Grove; Tjong T. Lie, Naperville; Gilbert Olvera, Chicago, all of Ill.

[73] Assignee: The Boler Company, Itasca, Ill.

[21] Appl. No.: 613,279

[22] Filed: Nov. 14, 1990

[51] Int. Cl.$^5$ .............................................. B60G 5/00
[52] U.S. Cl. .................................... 280/680; 280/686
[58] Field of Search ............... 280/680, 686, 681, 687, 280/676, 660, 669, 661

[56] References Cited
U.S. PATENT DOCUMENTS

| | | | |
|---|---|---|---|
| 1,699,530 | 1/1929 | Gurney | 280/680 |
| 2,139,937 | 12/1938 | Collender | 280/680 |
| 2,772,596 | 12/1956 | Trussell | 280/661 |
| 3,933,367 | 1/1976 | Tamas | 280/680 |
| 4,371,189 | 2/1983 | Raidel | 280/686 |

OTHER PUBLICATIONS
Watson Suspensions, 4/19/1990.

Primary Examiner—Kenneth R. Rice
Attorney, Agent, or Firm—Lockwood, Alex, FitzGibbon & Cummings

[57] ABSTRACT

In a tandem wheel and axle suspension for suspending a vehicle chassis, a flexible joint assembly for connecting the underside of each distal end of a fore-and-aft leaf spring equalizer beam to the subadjacent end of a transverse axle comprising a downwardly projecting spring anchor mounted on the underside of the distal end of the bottom leaf of the leaf spring, a load cushion formed of elastomeric material having an upwardly open socket in which the projecting portion of the spring anchor is embedded, and an axle bracket mounted on the subadjacent end of the axle having an upwardly open socket formation into which the load cushion is seated. An elastomeric rebound cushion is mounted over each distal end to prevent the spring anchor from disengaging the load cushion axle and is without upper torque rods.

9 Claims, 5 Drawing Sheets

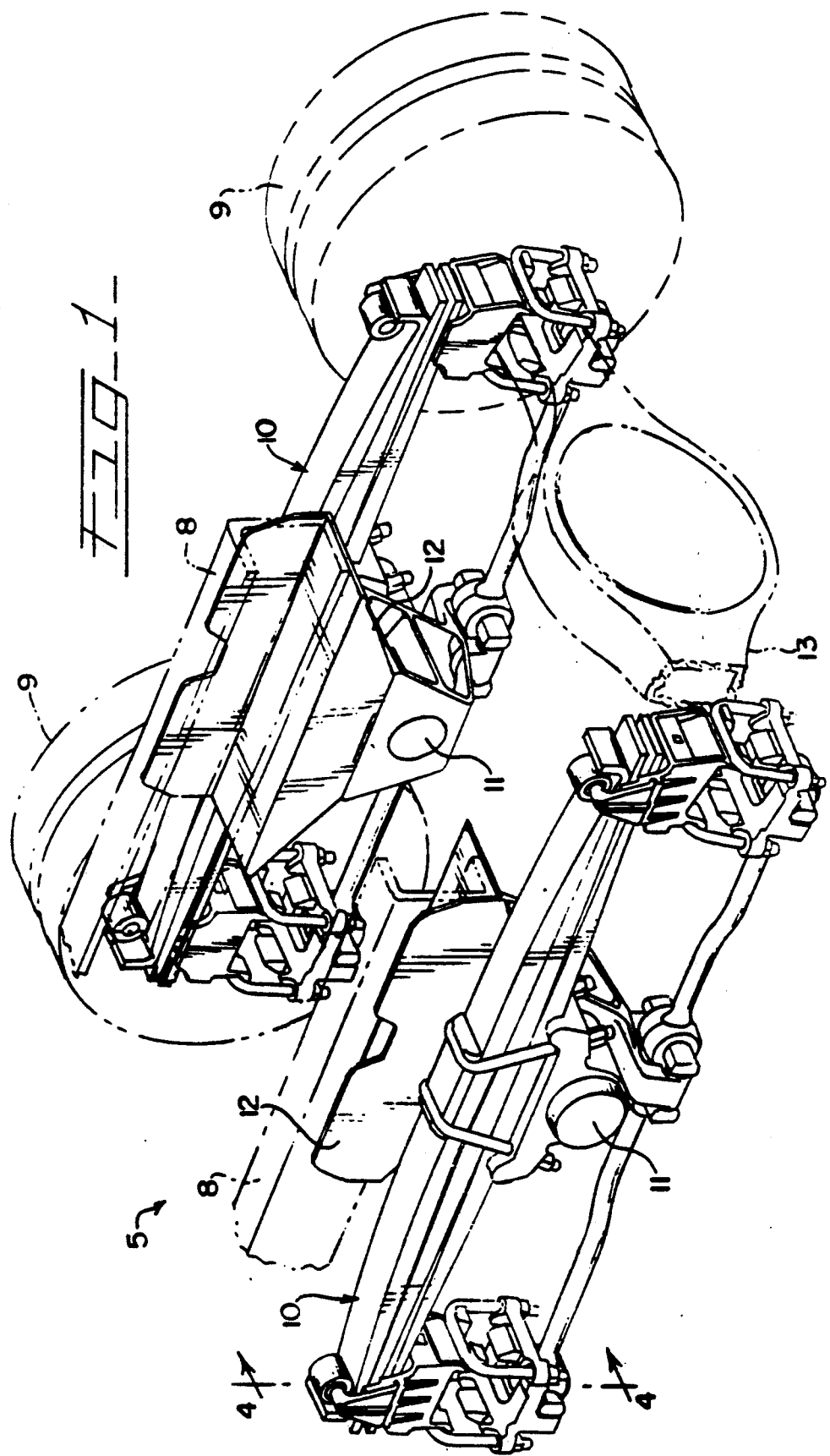

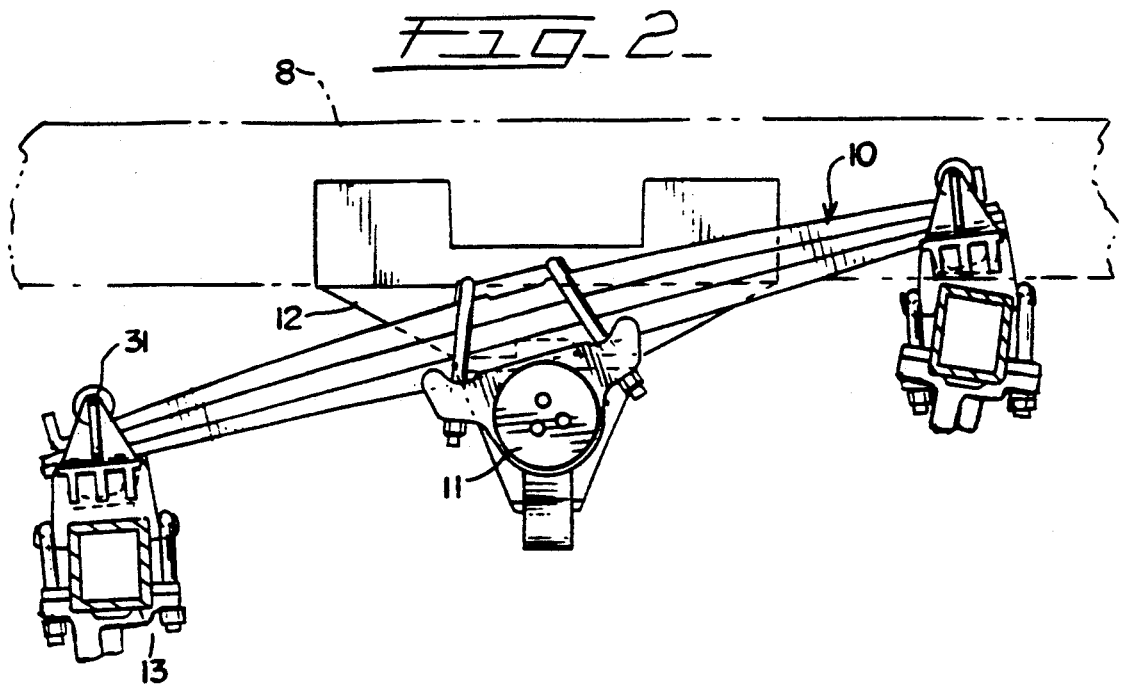
FIG_2_
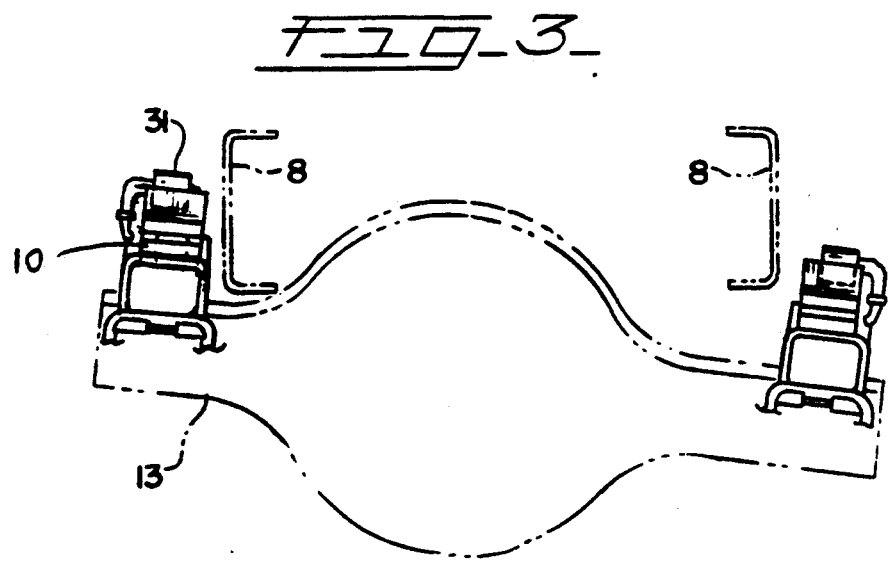
FIG_3_

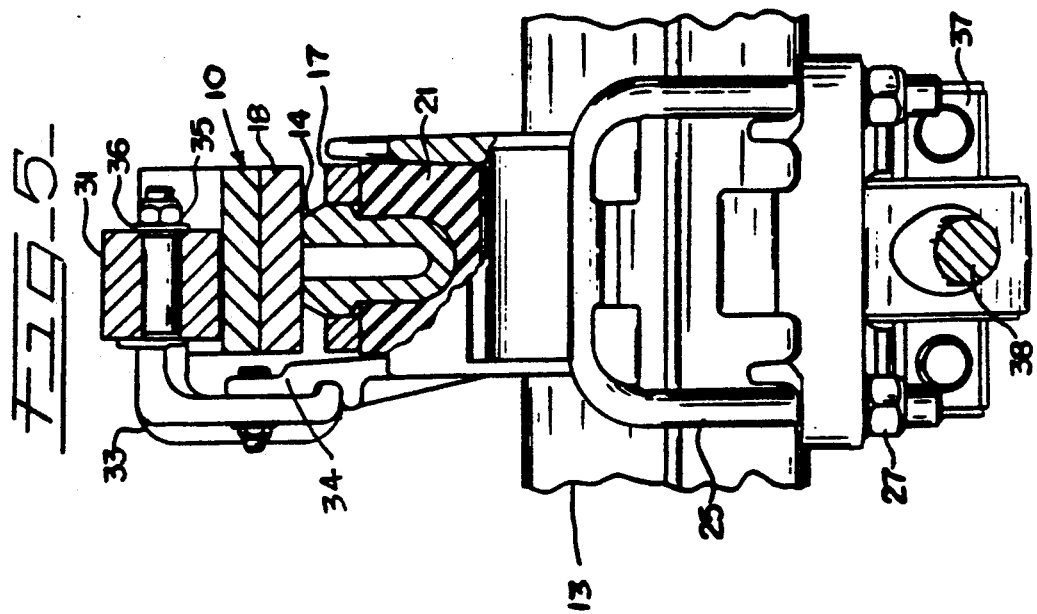
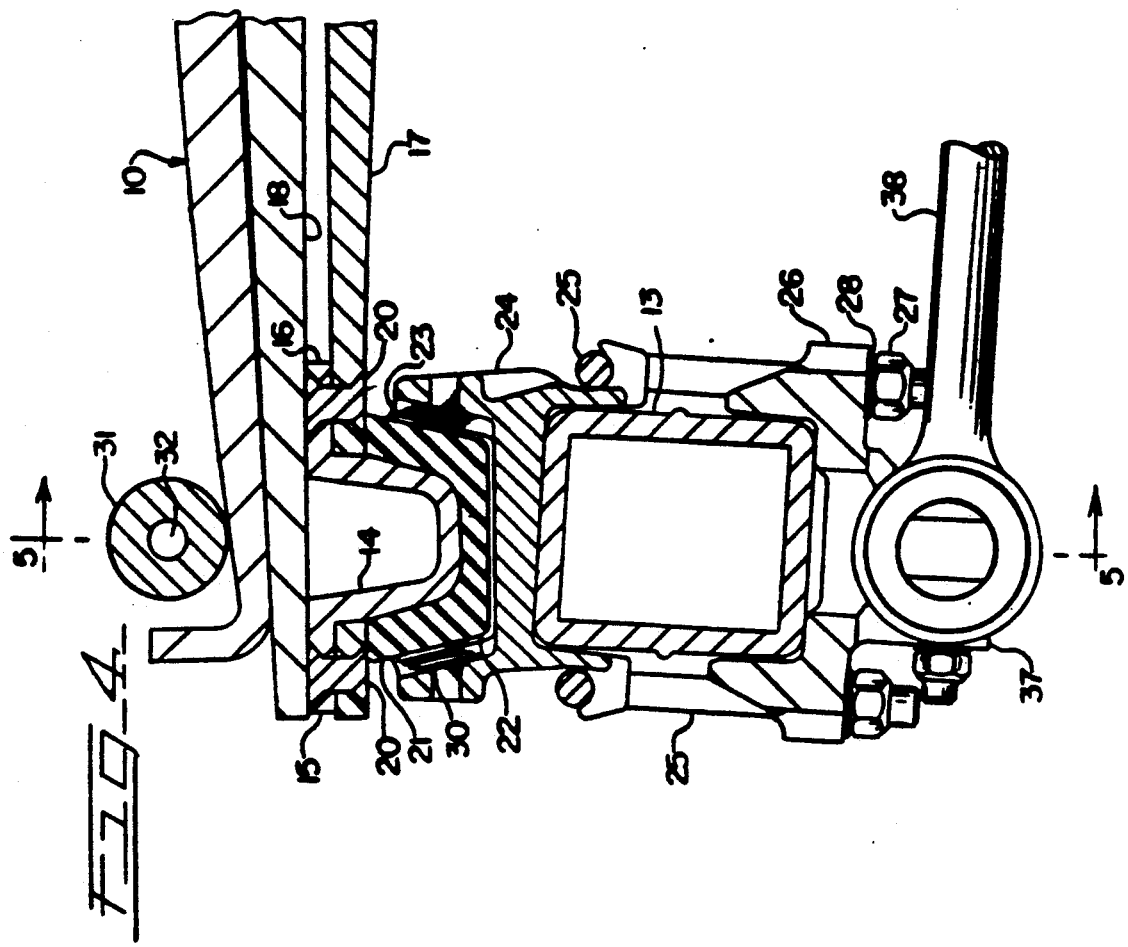

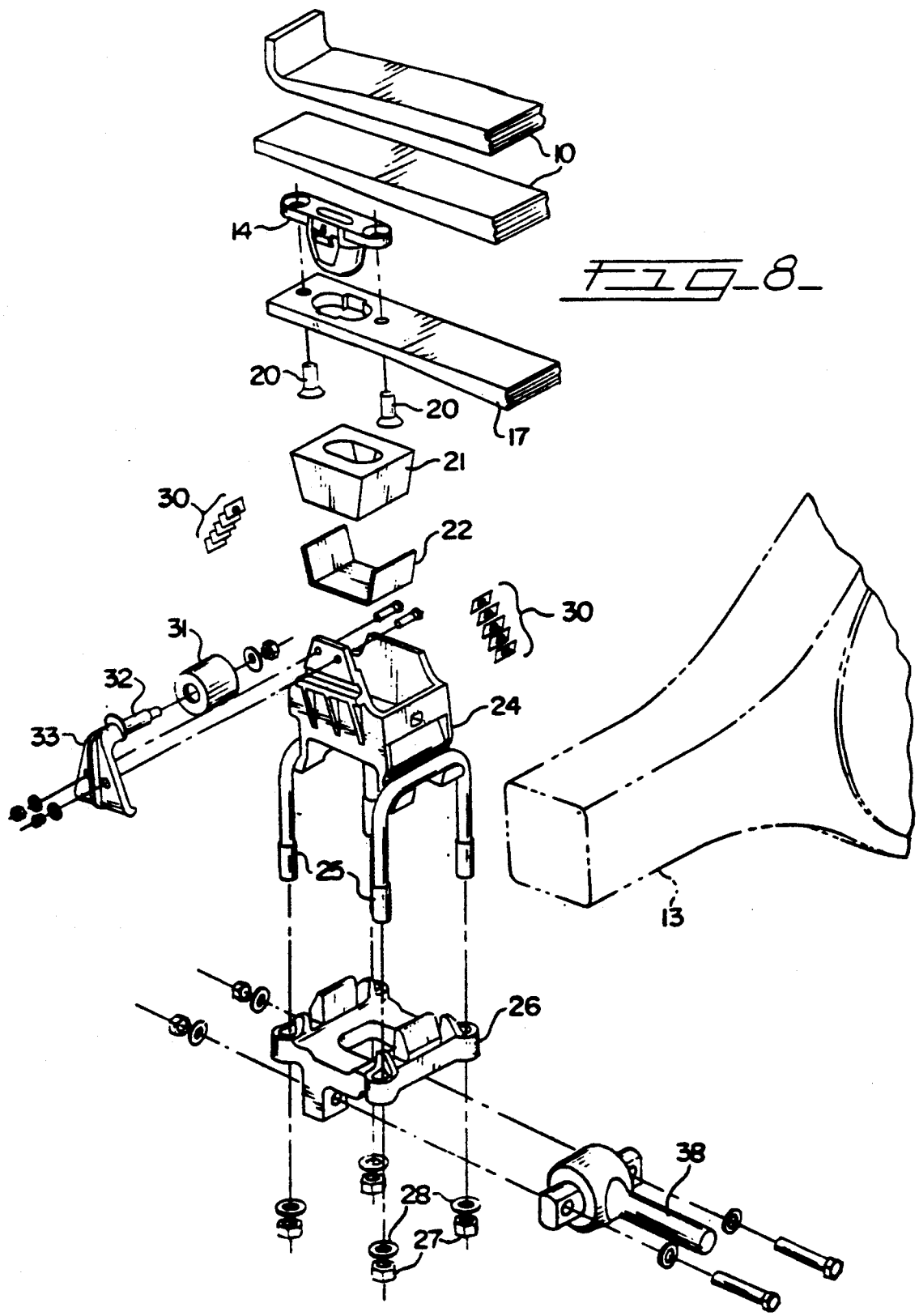

TANDEM WHEEL AND AXLE SUSPENSION

This invention relates to innovations and improvements in tandem wheel and axle suspensions, particularly for trucks and trailers wherein the equalizer or walking beams are in the form of fore-and-aft leaf springs. More particularly, the invention relates to such innovations and improvements comprising novel forms of flexible connections for interconnecting the distal ends of the leaf spring walking beams to the respective subadjacent ends of the front and rear transverse axles.

Heretofore, tandem wheel and axle suspension units utilizing leaf springs as the equalizer or walking beams have not been used as extensively as tandem wheel and axle suspensions utilizing rigid equalizer beams. The object of the present invention, generally stated, is the provision of tandem wheel and axle suspensions utilizing leaf spring equalizer beams which are less expensive than, but equal or exceed the performance and capacity of tandem wheel and axle suspensions utilizing rigid equalizer beams.

An important object of the invention is the provision of new and improved flexible interconnections between the distal ends of leaf spring equalizer beams and their respective subadjacent ends of the transverse axles in tandem wheel and axle suspensions and which provide the following advantages:

elimination of upper torque rods and mounting brackets thereby effecting substantial weight savings;

elimination of the need for wear pads on the axle brackets to accommodate friction caused by spring and axle relative motion; and convenient adjustability for axle drive line angles and/or suspension misalignment.

Certain other objects of the invention will be apparent to those skilled in the art in view of the following detailed description of a preferred embodiment of the invention taken together with the accompanying drawings, wherein:

FIG. 1 is a fragmentary perspective view of a tandem wheel and axle suspension assembly incorporating an embodiment of the present invention;

FIG. 2 is a side elevational view of the suspension assembly of FIG. 1 showing the left-hand leaf spring beam assembly tilted and front and rear axle housings in section;

FIG. 3 is a fragmentary rear elevational view of the suspension assemblies of FIG. 1 with the rear axle shown in broken line and tilted;

FIG. 4 is a fragmentary vertical sectional view on enlarged scale taken on line 4—4 of FIG. 1;

FIG. 5 is a vertical sectional view taken on line 5—5 of FIG. 4;

FIG. 8 is an exploded view of the flexible connection between a distal end of a leaf spring equalizer beam of FIG. i and the subadjacent end of a transverse axle.

Figure 6:
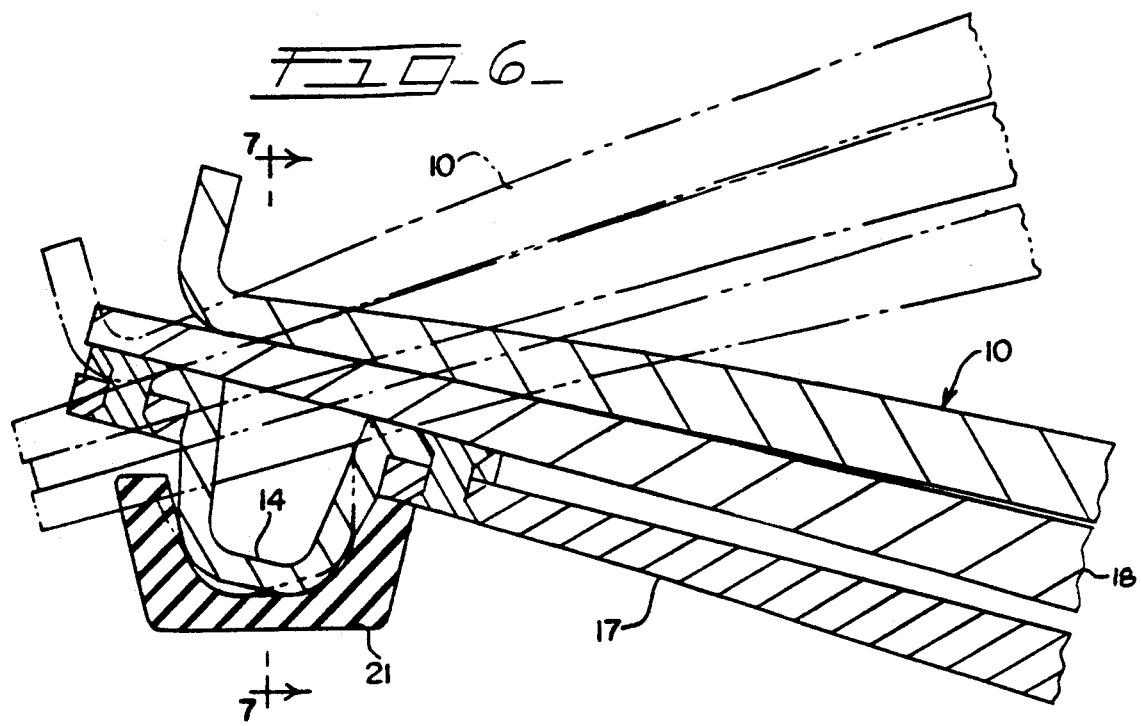
FIG. 6 is a fragmentary sectional view on enlarged scale illustrating two different tilted conditions (one in broken line) of the connection between the distal end of a leaf spring equalizer beam and the subadjacent load cushion carried by an axle.

In FIG. 1, a tandem wheel and axle suspension is indicated generally at 5 comprising a pair of fore-and-aft leaf springs 10 which also act as equalizer beams pivotally mounted midway between their distal ends on trunnions 11 pivotally mounted on trunnion brackets 12 bolted to the chassis frame side rails 8-8 shown in broken line. Dual wheels 9—9 (two shown) are mounted on opposite ends of the axles 13.

The present invention resides primarily in the flexible connection that connects each of the four distal ends of the leaf spring equalizer beams 10 to the subadjacent end of a transverse axle 13. One of the flexible interconnections is shown in FIGS. 4-8 and will be described in detail in connection therewith.

Referring to FIGS. 4 and 5 the fore-and-aft leaf spring equalizer beam 10 is shown with three leaves with a spring anchor 14 mounted on the distal end thereof. The spring anchor 14 has front and rear laterally extending flanges 15 and 16 which fit between the bottom leaf 17 of the spring 10 and the middle leaf 18. A pair of rivets 20—20 secure the flanges 15 and 16 to the lower leaf 17.

The spring anchor 14 seats in a mating cavity or socket formed in a load cushion 21 formed of an elastomeric or resilient rubber-like material. The bottom surface of the spring anchor 14 has a generally spherical configuration or shape both in a fore-and-aft direction and in a transverse or lateral direction. This shape permits both fore-and-aft articulation and cross-articulation between the distal end of each leaf spring 10 and its subadjacent axle 13.

The load cushion 21 is bonded to the interior surfaces of a rigid liner 22 (FIG. 8) which is received in an upwardly opening socket 23 of an upper axle bracket 24. The upper axle bracket 24 is secured to the top of the adjacent end of the axle 13 by means of a pair of U-bolts or shackles 25—25, the lower ends of which project through bolt holes in a lower axle bracket 26. Nuts 27—27 and lockwashers 28—28 on the protruding threaded ends of the U-bolts 25 draw the axle brackets 24 and 26 together onto the top and bottom surfaces of the axle 13 so as to secure the assembly rigidly together and in place. If desired, the upper axle bracket 24 and lower axle bracket 26 may be welded to the axle 13.

It will be seen from FIG. 4 that the dimension of the socket 23 in the upper bracket 24 in a fore-and-aft direction exceeds the fore-and-aft dimension of the liner 22 in which the load cushion 21 is bonded. The clearances thus provided in a fore-and-aft direction serve to accommodate the insertion of shims 30—30 thereby permitting fore-and-aft adjustment between the spring anchor 14 and the upper axle bracket 24, providing primary axle alignment.

In order to prevent a spring anchor 14 from disengaging or separating from its load cushion 21 under certain driving conditions a cylindrical rebound cushion 31 is provided having a center hole by which it may be mounted on a spindle 32 which extends laterally over the top leaf of the spring 10. Spindle 32 is carried by a bracket 33 (FIG. 5) which is bolted to an extension 34 on the outerside of the upper axle bracket 24. A nut 35 and washer 36 on the distal end of the spindle 32 secure the rebound cushion 31 in place.

The underside of the lower axle bracket 26 is provided with a pair of apertured ears 37 to which may be bolted the end of a lower torque rod 38.

Figure 7:
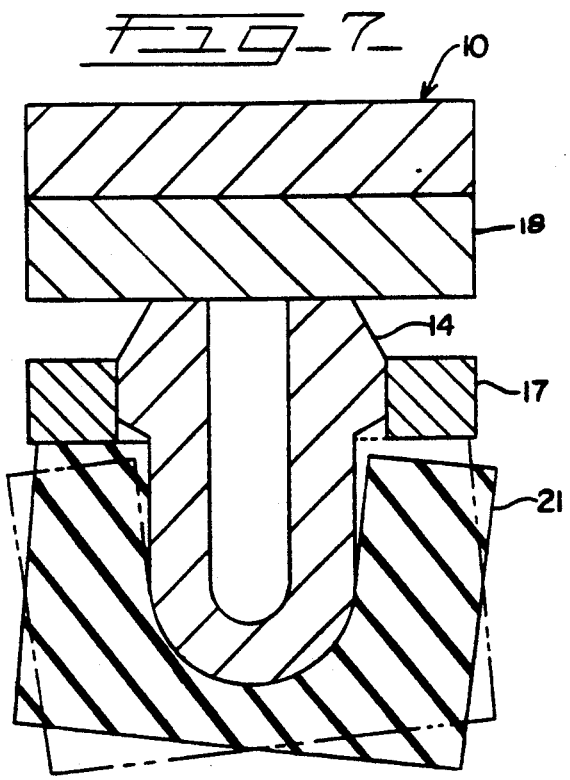
FIG. 7 is a fragmentary sectional view on enlarged scale taken on line 7—7 of FIG. 6 showing the load cushion tilted in two different directions (one in broken line)

The primary function of the flexible interconnection between each distal end of the fore-and-aft leaf spring equalizer beams 10 and the respective ends of the cross axles 13 is to allow axle cross articulation while still being able to absorb fore-and-aft (i.e. braking and acceleration) forces. The condition of fore-and-aft articulation is illustrated in FIG. 6 while the condition of cross articulation is illustrated in FIG. 7. In FIG. 6 the spring 10 and spring anchor 14 are shown in one condition in solid line and in an opposing position in broken line. In FIG. 7 the load cushion 21 is shown tilted in one condition in solid line and in the opposing position or condition in broken line. The load cushion 21 allows the associated spring 10 to remain essentially flat thereby reducing potentially damaging twist to the leaves.

The flexible joint assembly allows all tandem cornering/scrub loads through the tires and axles via the axle brackets into the sides of the springs through the trunion assemblies and into the trunion brackets. Fore-and-aft loads due to braking and accelerations of the vehicle are transferred from the axles and brackets to the springs through the load cushions and spring anchors. This reaction to fore-and-aft loads eliminates any upper torque rods that would otherwise be required. The torque rods 38 used below the axles 13 are used to control axle drive line angles, provide secondary adjustment for axle alignment and react to fore-and-aft loads at the flexible joints.

The load cushions 21 can be made of any natural or artificial elastomeric material that is resilient to shock loads, high in tensile and compressive strength, and high in abrasive resistance. By using load cushions of different rigidity, different levels of flexibility and load capacity may be accommodated without changing their overall size. Additional flexibility can be accomplished by forming cores or ribs in the load cushions in the side areas where flexibility is needed.

While the rigid liner 22 is open on both lateral sides, it could be closed on one side or a complete container closed on all sides.

The flexible connections or joint assemblies are rugged, readily serviced, easy to assemble and adjust, and relatively inexpensive.

What is claimed is:

1. In a tandem wheel and axle suspension for suspending a vehicle chassis comprising a pair of fore-and-aft leaf spring equalizer beams pivotally mounted midway between their opposite ends on trunnion brackets mounted on opposite sides of the chassis and front and rear transverse axles supported at their opposite ends on the respective front and rear ends of the leaf spring equalizer beams, improved means for interconnecting each distal end of said axles to the adjacent distal end of one of said leaf spring equalizer beams comprising, a spring anchor rigidly mounted on and downwardly projecting from the underside of the distal end of the leaf spring equalizer beam, an axle bracket mounted on the adjacent distal end of the axle and having an upper portion extending above the axle, and an elastomeric load cushion mounted on said bracket upper portion having an upwardly open socket in which said downwardly projecting spring anchor is seated.

2. The improvement called for in claim 1, wherein said load cushion is bonded to the interior of a rigid outer support which is seated in said socket.

3. The improvement called for in claim 2, wherein the interior of said socket is larger than the exterior of said load cushion seated therein and its said rigid outer support so as to provide space therebetween for insertion of shims.

4. The improvement called for in claim 3, wherein said rigid support is bonded to the front, rear and underside of said load cushion and said space for insertion of shims is located at the front and rear of said rigid support and the opposing front and rear surfaces of said socket.

5. The improvement called for in claim 1, wherein each said spring anchor has a rounded bottom surface.

6. The improvement called for in claim wherein the bottom surface of each said spring anchor and the mating bottom surface of its associated load cushion socket have a spherical shape laterally so as to permit cross articulation and a spherical shape fore-and-aft so as to permit fore-and-aft articulation.

7. The improvement called for in claim 1, wherein a rebound cushion is mounted over the distal end of each said leaf spring so as to prevent its adjacent spring equal in lower anchor from disengaging its said load cushion 8. The improvement called for in claim 1, wherein said suspension includes four lower torque rods each of which is connected at one end to the adjacent one of said axle brackets and is without upper torque rods.

9. In a tandem wheel and axle suspension for suspending a vehicle chassis comprising a pair of fore-and-aft leaf spring equalizer beams pivotally mounted midway between their opposite ends on trunnion brackets mounted on opposite sides of the chassis and front and rear transverse axles supported at their opposite ends on the respective front and rear ends of the leaf spring equalizer beams, improved means for interconnecting each distal end of said axles to the adjacent distal end of one of said leaf spring equalizer beams comprising, a spring anchor mounted on the underside of the distal end of the leaf spring equalizer beam, an axle bracket mounted on the adjacent distal end of the axle and having an upper portion extending above the axle, an elastomeric load cushion mounted on said bracket upper portion having a socket in which said spring anchor is seated, and a rebound cushion mounted over the distal end of each said leaf spring equalizer beam so as to prevent its adjacent spring anchor from disengaging its said load cushion, and wherein said rebound cushion is an elastomeric roller mounted on the upper end of a rebound bracket said rebound bracket being mounted on and extending upwardly from the adjacent of said axle brackets and said upper end extending laterally over the distal end of the leaf spring equalizer beam.

* * * * *

UNITED STATES PATENT AND TRADEMARK OFFICE
CERTIFICATE OF CORRECTION

PATENT NO. : 5,078,420

DATED : January 7, 1992

INVENTOR(S) : Roger D. Jable; Tjong T. Lie and Gilbert Olvera

It is certified that error appears in the above-identified patent and that said Letters Patent is hereby corrected as shown below:

Column 4,

Claim 6, line 1, insert after "claim", --1,--.
Column 4,
Claim 7, line 3, insert after "spring", --equalizer beam--, same claim, lines 3-4, delete "equal in lower".

Signed and Sealed this

Twenty-second Day of June, 1993

Attest:

MICHAEL K. KIRK

Attesting Officer

Acting Commissioner of Patents and Trademarks